(No Model.)
A. F. SCHWALB.
COMBINED WATER FILTER AND COOLER.
No. 263,231.   Patented Aug. 22, 1882.
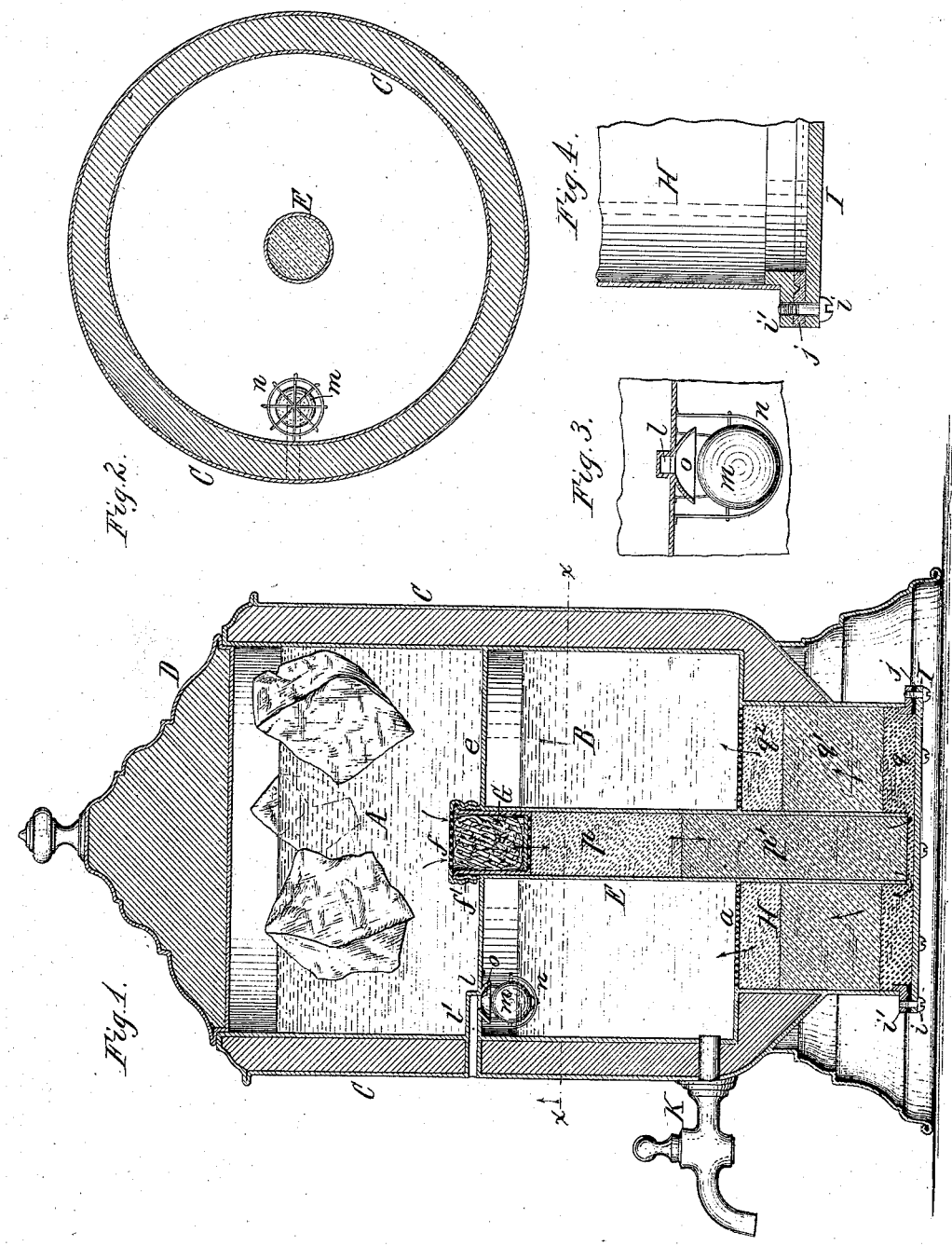

UNITED STATES PATENT OFFICE.

ALPHONS F. SCHWALB, OF BUFFALO, NEW YORK.

COMBINED WATER FILTER AND COOLER.

SPECIFICATION forming part of Letters Patent No. 263,231, dated August 22, 1882.

Application filed April 27, 1882. (No model.)

*To all whom it may concern:*

Be it known that I, ALPHONS F. SCHWALB, of the city of Buffalo, in the county of Erie and State of New York, have invented new and useful Improvements in a Combined Water Filter and Cooler, of which the following is a specification.

This invention relates more particularly to an improvement in domestic water filters and coolers, and has for its object to so construct the filter that the chamber containing the filtering material can be readily emptied and cleaned when the filtering material is required to be renewed.

My invention consists, to that end, in constructing the filter with a removable bottom in the chamber which contains the filtering material, also of the peculiar construction of such chamber, and also of the means whereby the escape of water from the chamber containing the filtered water through the air-vent of such chamber is prevented, as will be hereinafter fully set forth.

In the accompanying drawings, Figure 1 is a vertical section of my improved filter. Fig. 2 is a horizontal section in line *x x*, Fig. 1. Fig. 3 is an enlarged sectional view of the air-vent at right angles to Fig. 1. Fig. 4 is an enlarged fragmentary sectional view of the removable bottom.

Like letters of reference refer to like parts in the several figures.

A represents the chamber which receives the water to be filtered, and B the chamber which receives the filtered water.

C represents the side walls of the filter, and D the cover thereof.

*e* represents a horizontal plate or diaphragm which separates the upper chamber, A, from the lower chamber, B.

E represents a vertical tube, which is arranged centrally in the filter and secured near its upper end to the plate *e*. The upper end of the tube E projects above the plate *e*, and is closed by a perforated plate or strainer, *f*, which is secured to the upper end of the tube E by a screw-threaded flange, *f'*.

G represents a cup arranged in the upper end of the tube E, and resting upon the upper edge thereof by means of a flange formed on the cup G. The bottom of this cup is perforated, and the cup is filled with a sponge or other porous material.

H represents the chamber which contains the filtering material. This chamber is arranged below the bottom of the chamber B, to which it is firmly secured, and from which it is separated by a perforated plate, *a*, which surrounds the tube E.

I represents a removable bottom closing the lower end of the chamber H, to which it is secured by screw-bolts *i*, tapped into a flange, *i'*, which is secured to the lower end of the chamber H, or by any other suitable means. A packing-ring, *j*, of rubber or other suitable material is interposed between the bottom I and the flange *i'*, to form a water-tight joint.

The tube E depends into the chamber H and terminates at a short distance above the bottom thereof, so as to leave an open space, through which the water can pass from said tube into the chamber H.

K represents the faucet, through which the filtered water can be drawn from the chamber B.

*l* represents an opening formed in the plate *e* and communicating with the chamber B, and *l'* is a tube or air-passage extending from the opening *l* through the side wall of the filter and communicating with the exterior atmosphere, so as to permit the air to escape from said chamber as the water enters the same, or to enter said chamber B when water is withdrawn therefrom.

*m* represents a globular or other suitable valve arranged in the chamber B to close the opening *l* before the water-level rises to the top of said chamber. As shown in the drawings, the globular valve *m* is arranged in a cage, *n*, which is secured to the plate *e*, and whereby the valve is supported at a short distance below the opening *l*. The latter is preferably provided with an enlarged mouth, *o*, which forms a seat for the valve. The valve is made hollow or of material having a smaller specific gravity than water, so that the valve is raised against its seat by the water and caused to close the opening *l* before the water-level reaches said opening, whereby the escape of water through said opening is prevented.

The upper portion of the tube E is filled with fine gravel, as indicated at *p*, and the lower portion of the tube is filled with pulverized charcoal, as indicated at $p'$.

The lower portion of the chamber H is filled with coarse gravel, as indicated at $q$. The central portion is filled with charcoal, as indicated at $q'$, and the upper portion with fine gravel, as indicated at $q^2$.

The water passes from the chamber A into and through the tube E and escapes from the lower end of said tube into the chamber H, through which it passes in an upward direction into the chamber B, where it accumulates. During its passage through the tube E and chamber H the water is completely deprived of its impurities.

When the filtering material contained in the tube E and chamber H has become so charged with impurities that it requires to be removed the bottom I is removed from the chamber H, when the filtering material is readily removed from said chamber and the tube E, and as the upper end of said tube is readily opened by removing the strainer $f$ and cup G these parts can be easily cleaned and refilled.

I claim as my invention—

1. In a filter, the combination of a chamber, A, receiving the water to be filtered, a chamber, B, provided with a faucet for drawing off the filtered water accumulating therein and arranged below the chamber A, a chamber, H, filled with filtering material and arranged below the chamber B and communicating therewith, and a tube, E, extending from the chamber A into the chamber H, substantially as set forth.

2. In a filter, the combination, with the water-chambers A and B, of the chamber H, filled with filtering material and arranged below the chamber B and communicating therewith, a tube, E, extending from the chamber A into the chamber H, and a removable bottom, I, applied to the lower end of the chamber H, substantially as set forth.

3. The combination, with the water-chambers A and B, of a chamber, H, filled with filtering material, arranged below the chamber B and communicating therewith, a tube, E, extending from the chamber A to the chamber H, a removable strainer, $f$, and cup G, applied to the upper end of the tube E, and a removable bottom, I, applied to the chamber H, substantially as set forth.

4. The combination, with the water-chamber B, of the opening $l$ and passage $l'$, the valve-seat $o$, spherical valve $m$, and cage $n$, substantially as set forth.

A. F. SCHWALB.

Witnesses:
JNO. J. BONNER,
CHAS. F. GEYER.